(12) United States Patent
Bae et al.

(10) Patent No.: US 6,473,440 B1
(45) Date of Patent: Oct. 29, 2002

(54) CLOCK SUPPLYING APPARATUS FOR MULTILINE TRANSMISSION SYSTEM

(75) Inventors: Sung-Jin Bae, Seoul; Han-Seok Kim, Kyonggi-do, both of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/251,326

(22) Filed: Feb. 17, 1999

(30) Foreign Application Priority Data

Feb. 17, 1998 (KR) .............................................. 98-4783

(51) Int. Cl.[7] .................................................. H04J 3/06
(52) U.S. Cl. ....................................... 370/503; 370/518
(58) Field of Search ................................ 370/241, 252, 370/244, 242, 310, 343, 350, 503, 518; 375/359, 362

(56) References Cited

U.S. PATENT DOCUMENTS

| | | | |
|---|---|---|---|
| 4,481,640 A | 11/1984 | Chow et al. | |
| 4,972,410 A | 11/1990 | Cohen et al. | |
| 4,984,247 A | 1/1991 | Kaufmann | |
| 5,008,636 A | * 4/1991 | Markinson et al. | ............. 331/2 |
| 5,148,276 A | * 9/1992 | Furumiya et al. | ........... 358/153 |
| 5,357,542 A | 10/1994 | Suzuki | |
| 5,459,419 A | * 10/1995 | Hatakenaka | ................. 327/141 |
| RE35,209 E | 4/1996 | Partyka et al. | |
| 5,610,907 A | 3/1997 | Barrett | |
| 5,631,931 A | * 5/1997 | Takano et al. | ............... 375/347 |

* cited by examiner

Primary Examiner—Ricky Ngo
(74) Attorney, Agent, or Firm—Robert E. Bushnell, Esq.

(57) ABSTRACT

An apparatus supplying a clock in a multiline radio transmission system. The apparatus includes a clock generator for generating a clock from a reference signal, a clock branching module for receiving the clock generated from the clock generator and branching the clock, at least one clock patching module for receiving the branched clock from the clock branching module and patching the clock, and a clock distribution module for receiving the patched clock from the clock patching module and distributing the clock to each unit for receiving a clock of the multiline radio transmission system.

11 Claims, 2 Drawing Sheets

CLOCK SUPPLYING APPARATUS FOR MULTILINE TRANSMISSION SYSTEM

CLAIM OF PRIORITY

This application makes reference to, incorporates the same herein, and claims all benefits accruing under 35 U.S.C. §119 from an application entitled CLOCK SUPPLYING APPARATUS FOR MULTILINE TRANSMISSION SYSTEM earlier filed in the Korean Industrial Property Office on the Feb. 17, 1998, and there duly assigned Ser. No. 98-4783, a copy of which is annexed hereto.

BACKGROUND OF THE INVENTION

1. Technical Field

The present invention relates to a clock supplying apparatus for a synchronous transmission system, and more particularly to an apparatus for supplying a clock to a line with a reduced time delay in a multiline synchronous transmission system.

2. Related Art

In a synchronous radio transmission system, a clock is one of important elements determining the performance of the system. Especially, in a general multiline system, clocks are generated with respect to respective lines due to a delay and skew of a supplied clock, and the generated clock is used only at a corresponding line. Clocks used in the radio transmission system are widely divided into a system clock for transmitting data, a clock reproduced from data which is received from the other station, and a line clock for generating a reference clock from the reproduced clock by using a PLL (phase locked loop).

The synchronous radio transmission system includes, with respect to each line, a frequency synthesizer for synchronizing a frequency and a PLL circuit for generating a reference signal from a reproduced signal. That is, each line requires at least two clock generators. Therefore, it is not easy to synchronize a clock for each line. Moreover, the cost of production rises and a product of a compact construction is not obtained. Further, since a synchronous system is used, it is difficult to maintain compatibility between lines in the multiline system.

I have found that problems with transmission systems can be extremely inconvenient. Efforts have been made to improve transmission systems.

Exemplars of recent efforts in the art include U.S. Pat. No. 5,610,907 for ULTRAFAST TIME HOPPING CDMA-RF COMMUNICATIONS: CODE-AS-CARRIER, MULTI-CHANNEL OPERATION, HIGH DATA RATE OPERATION AND DATA RATE ON DEMAND issued to Barrett, U.S. Pat. No. 5,357,542 for REPEATER STATION WHEREIN INPUT FRAME DATA ARE ACCESSIBLE issued to Suzuki, U.S. Pat. No. 4,984,247 for DIGITAL RADIO TRANSMISSION SYSTEM FOR A CELLULAR NETWORK, USING THE SPREAD SPECTRUM METHOD issued to Kaufmann, U.S. Pat. No. 4,972,410 for METHOD AND APPARATUS FOR CONTROLLING SIGNAL COHERENCY IN SIMULCAST SYSTEMS issued to Cohen et al., U.S. Pat. No. 4,481,640 for SPREAD SPECTRUM MODEM issued to Chow et al., and U.S. Pat. No. 35,209 for SPREAD SPECTRUM COMMUNICATIONS SYSTEM issued to Partyka et al.

While these recent efforts provide advantages, I note that they fail to adequately provide a clock supplying apparatus for a multiline transmission system.

SUMMARY OF THE INVENTION

It is therefore an object of the present invention to provide a clock supplying apparatus which can minimize a delay and skew of a clock by generating a stabilized clock using a digital technology.

It is another object of the present invention to provide an apparatus for supplying the same clock generated from one clock generator to an entire system.

To achieve these and other objects, the present invention provides an apparatus for supplying a clock in a multiline radio transmission system, including a clock generator for generating a clock from a reference signal, a clock branching module for receiving the clock generated from the clock generator and branching the clock, at least one clock patching module for receiving the branched clock from the clock branching module and patching the clock, and a clock distribution module for receiving the patched clock from the clock patching module and distributing the clock to each unit for receiving a clock of the multiline radio transmission system.

To achieve these and other objects in accordance with the principles of the present invention, as embodied and broadly described, the present invention provides an apparatus supplying a clock signal, comprising: a clock generator generating a first clock signal in response to a reference signal; a clock branching unit receiving said first clock signal and outputting a plurality of second clock signals in response to said first clock signal, said plurality of second clock signals including an alpha clock signal and a beta clock signal; at least one first clock patching unit receiving said alpha clock signal from said clock branching unit and outputting a first patched clock signal corresponding to said alpha clock signal; a multiline transmission system transmitting data on a plurality of first lines, said system comprising a plurality of first monitoring units monitoring a status of said plurality of first lines; and a first clock distribution unit receiving said first patched clock signal from said at least one first clock patching unit and distributing said first patched clock signal to each one of said plurality of first monitoring units of said multiline transmission system.

To achieve these and other objects in accordance with the principles of the present invention, as embodied and broadly described, the present invention provides an apparatus supplying a clock signal, comprising: a clock generator generating a first clock signal; a transmission system transmitting data on a plurality of first lines, said system comprising a plurality of first monitoring units monitoring a status of said plurality of first lines; and a first clock distribution unit receiving a first patched clock signal corresponding to said first clock signal, said first clock distribution unit distributing said first patched clock signal to each one of said plurality of first monitoring units of said transmission system.

To achieve these and other objects in accordance with the principles of the present invention, as embodied and broadly described, the present invention provides an apparatus supplying a clock signal, comprising: a clock generator generating a first clock signal; a transmission system transmitting data on a plurality of first lines; and a first clock distribution unit receiving a first patched clock signal corresponding to said first clock signal, said first clock distribution unit distributing said first patched clock signal to each one of said plurality of first lines of said transmission system.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

A preferred embodiment of the present invention will be described hereinbelow with reference to the accompanying drawings. In the following description, well known constructions or functions are not described in detail so as not to obscure the present invention.

Figure 1:
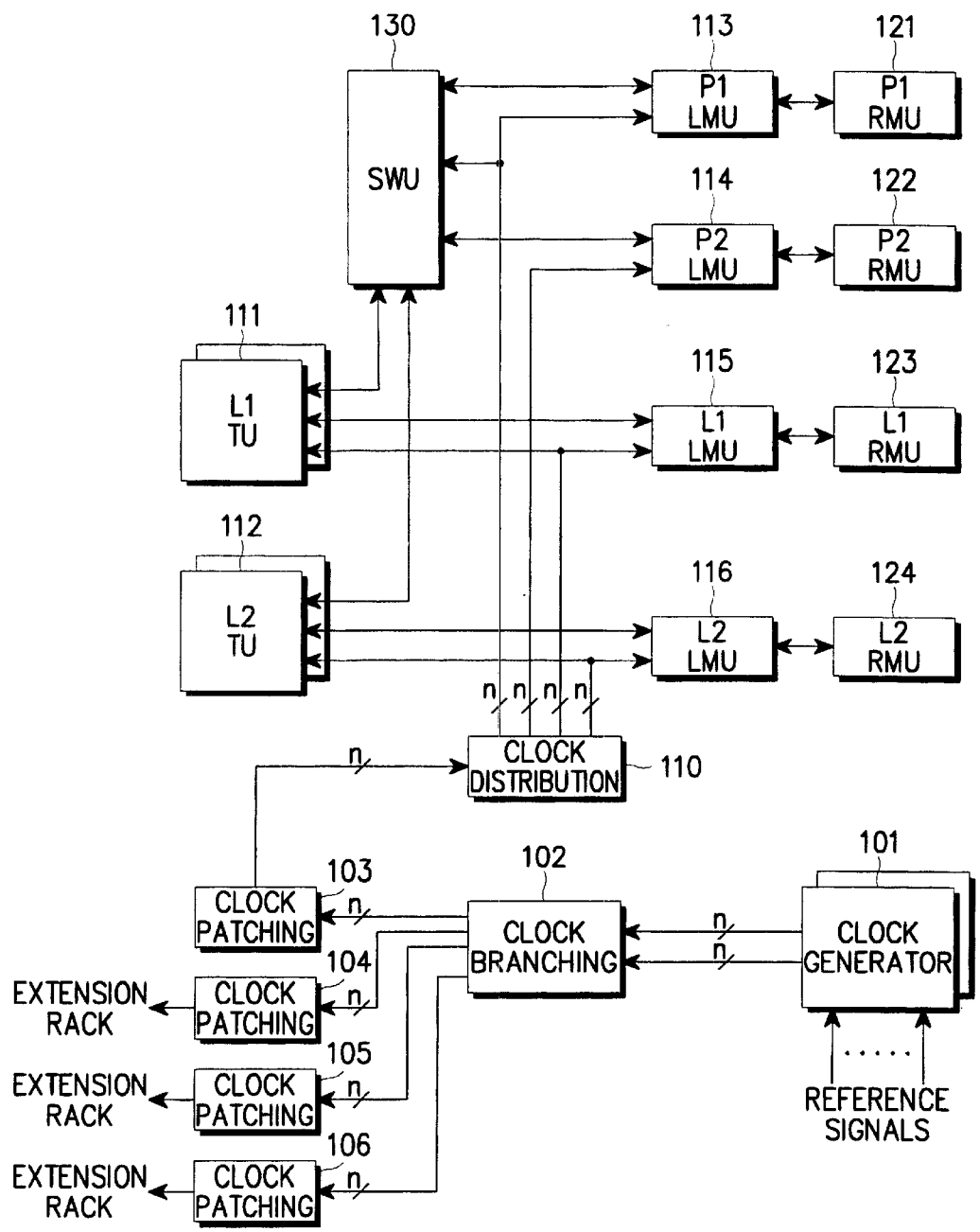
FIG. 1 is a block diagram of an apparatus for supplying a clock generated from a clock generator to a main rack, in accordance with the principles of the present invention.

FIG. 1 illustrates an apparatus for supplying a clock generated from a clock generator to a main rack according to the present invention. The main rack of a radio transmission system for receiving a clock includes tributary units (TUs) 111 and 112 for connecting subscribers. In a preferred embodiment of the present invention, the two tributary units 111 and 112 are installed in the main rack. A plurality of line monitoring units (LMUs) 113, 114, 115 and 116 monitor the status of lines. A switching unit (SWU) 130 connects or disconnects the line monitoring units 113, 114, 115 and 116 to or from the tributary units 111 and 112. Namely, data is applied to each board by the switching operation of the switching unit 130. The line monitoring units 113, 114, 115 and 116 are respectively connected to radio monitoring units (RMUs) 121, 122, 123 and 124 for monitoring the status of radio frequency signals.

The main rack also includes a clock generator 101. The clock generator 101 generates a clock extracted from data which is received from the other station or generates a clock from a reference signal for transmitting data to the radio transmission system. The clock generator 101 has a dual structure of 1+1 in order to stabilize a clock supplied to the interior of the radio transmission system. The clock generated from the clock generator 101 is supplied to a clock branching module 102. The clock branching module 102 branches the clock into the number of main and extension racks. It is assumed that there are one main rack and three extension racks. Hence, the clock branching module 102 generates the same four clocks. The respective clocks are supplied to clock patching modules 103, 104, 105 and 106. In this case, coaxial cables having the same length are used to minimize a delay and skew of the clock with respect to each line upon transmitting the clock to the racks. The clock patching module 103 connected to the main rack supplies the clock to a clock distribution module 110 by using a patching technique. The clock distribution module 110 supplies the patched clock to the respective units, that is, to the switching unit 130, the tributary units 111 and 112 and the line monitoring units 113, 114, 115 and 116. The clock distribution module 110 is constructed in consideration of fan-out according to the number of units for receiving the clock. Therefore, a delay and skew of the clock supplied to the main rack of the multiline radio transmission system can be minimized.

Figure 2:
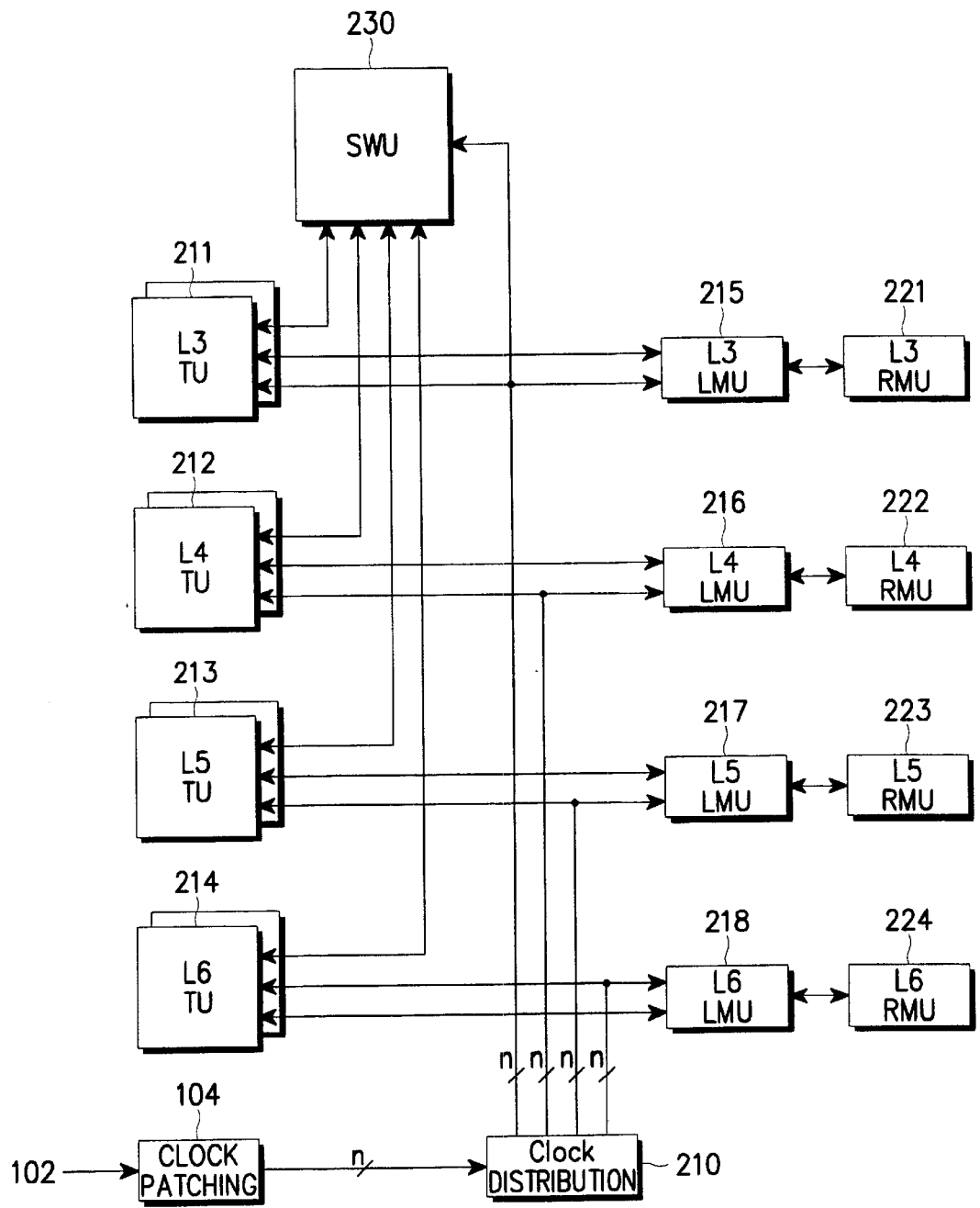
FIG. 2 is a block diagram of an apparatus for supplying a clock to an extension rack, in accordance with the principles of the present invention.

FIG. 2 illustrates an apparatus for supplying a clock to the extension rack of the radio transmission system according to the present invention. The extension rack includes a switching unit (SWU) 230 for performing a switching operation to transmit and receive data to and from the other station. A plurality of tributary units (TUs) 211, 212, 213 and 214 connect subscribers. Line monitoring units (LMUs) 215, 216, 217 and 218 connected respectively to the tributary units 211, 212, 213 and 214 monitor lines. The line monitoring units 215, 216, 217 and 218 are respectively connected to radio monitoring units (RMUs) 221, 222, 223 and 224.

The clock patching module 104 supplies the clock received from the clock branching module 102 shown in FIG. 1 to a clock distribution module 210 by using a patching technique. The clock distribution module 210 supplies the patched clock to the switching unit 230, the tributary units 211, 212, 213 and 214, and the line monitoring units 215, 216, 217 and 218. The clock distribution module 210 is constructed in consideration of fan-out according to the number of units for receiving the clock.

As described previously, since the clock supplied to the main rack and the extension racks of the radio transmission system is generated only through the main rack, it is possible to achieve a compact system. Moreover, the delay and skew of the clock with respect to each line can be minimized by using a patching technique upon supplying a clock to the radio transmission system and by designing the clock distribution module in consideration of fan-out.

The present invention can pertain to ITU (International Telecommunication Union) standard in which SDH (Synchronous Digital Hierarchy) transfer is performed based on ITU-T (International Telecommunication Union-Telecommunication Sector), G783, G810, G811 and etc. That is, the present invention as proposed can pertain to the above international standard but is not limited to this standard.

FIG. 1 can be considered as a system structure of a main rack according to the present invention using SDH Digital Micro-wave. The main rack includes a clock generator 101. A dual structure of the clock generator is to guarantee stable clock supply in case that one of the clock generators fails. Therefore, a second clock generator can be included as a backup used only if the first clock fails. FIG. 2 is an extension rack according to the present invention. There is no separate clock generator 101 in the extension rack. Instead, the clock is supplied from the main rack to the extension rack.

The following is a concept of a patching technique. In order for the clock to be supplied from the main rack to the extension rack as explained above, coaxial cables of high performance are used. In other words, the clock generator 101, although it is included in the main rack, supplies the clock to the extension rack as well as the main rack by means of the coaxial cables having same physical condition. More specifically, the main rack itself generates the clock on the one hand and receives the clock by means of the coaxial cable on the other hand for the exact synchronization of the clock throughout the system.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An apparatus supplying a clock signal, comprising:
    a clock generator generating a first clock signal in response to a reference signal;
    a clock branching unit receiving said first clock signal and outputting a plurality of second clock signals in response to said first clock signal, said plurality of second clock signals including an alpha clock signal and a beta clock signal;
    at least one first clock patching unit receiving said alpha clock signal from said clock branching unit and outputting a first patched clock signal corresponding to said alpha clock signal;
    a multiline transmission system transmitting data on a plurality of first lines, said system comprising a plurality of first monitoring units monitoring a status of said plurality of first lines; and
    a first clock distribution unit receiving said first patched clock signal from said at least one first clock patching unit and distributing said first patched clock signal to each one of said plurality of first monitoring units of said multiline transmission system.

2. The apparatus of claim 1, said multiline transmission system corresponding to a multiline radio transmission system transmitting said data utilizing radio frequency signals.

3. The apparatus of claim 1, said clock branching unit receiving said first clock signal from said clock generator.

4. The apparatus of claim 1, said multiline transmission system further comprising:
    a first interface unit being connected to a plurality of first subscribers; and
    a first switching unit selectively connecting and disconnecting said plurality of first monitoring units with and from said first interface unit.

5. The apparatus of claim 4, said first clock distribution unit distributing said first patched clock signal to said first interface unit and to said first switching unit.

6. The apparatus of claim 2, said multiline radio transmission system further comprising:
    a first interface unit being connected to a plurality of first subscribers; and
    a first switching unit selectively connecting and disconnecting said plurality of first monitoring units with and from said first interface unit.

7. The apparatus of claim 6, said first clock distribution unit distributing said first patched clock signal to said first interface unit and to said first switching unit.

8. The apparatus of claim 6, said multiline radio transmission system further comprising a first radio monitoring unit monitoring a status of said radio frequency signals.

9. The apparatus of claim 1, said system corresponding to a synchronous transmission system.

10. The apparatus of claim 4, said multiline transmission system further comprising:
    a plurality of second lines on which data is transmitted;
    a plurality of second monitoring units monitoring a status of said plurality of second lines;
    a second interface unit being connected to a plurality of second subscribers;
    a second switching unit selectively connecting and disconnecting said plurality of second monitoring units with and from said second interface unit;
    at least one second clock patching unit receiving said beta clock signal from said clock branching unit and outputting a second patched clock signal corresponding to said beta clock signal;
    a second clock distribution unit receiving said second patched clock signal from said at least one second clock patching unit, said second clock distribution unit distributing said second patched clock signal to each one of said plurality of second monitoring units, to said second interface unit, and to said second switching unit.

11. The apparatus of claim 10, said multiline transmission system further comprising:
    a main unit including said plurality of first monitoring units, said first interface unit, and said first switching unit; and
    a first extension unit including said plurality of second monitoring units, said second interface unit, and said second switching unit.

* * * * *